J. CRAWFORD.
Trace-Carriers.
No. 152,727. 
Patented July 7, 1874.
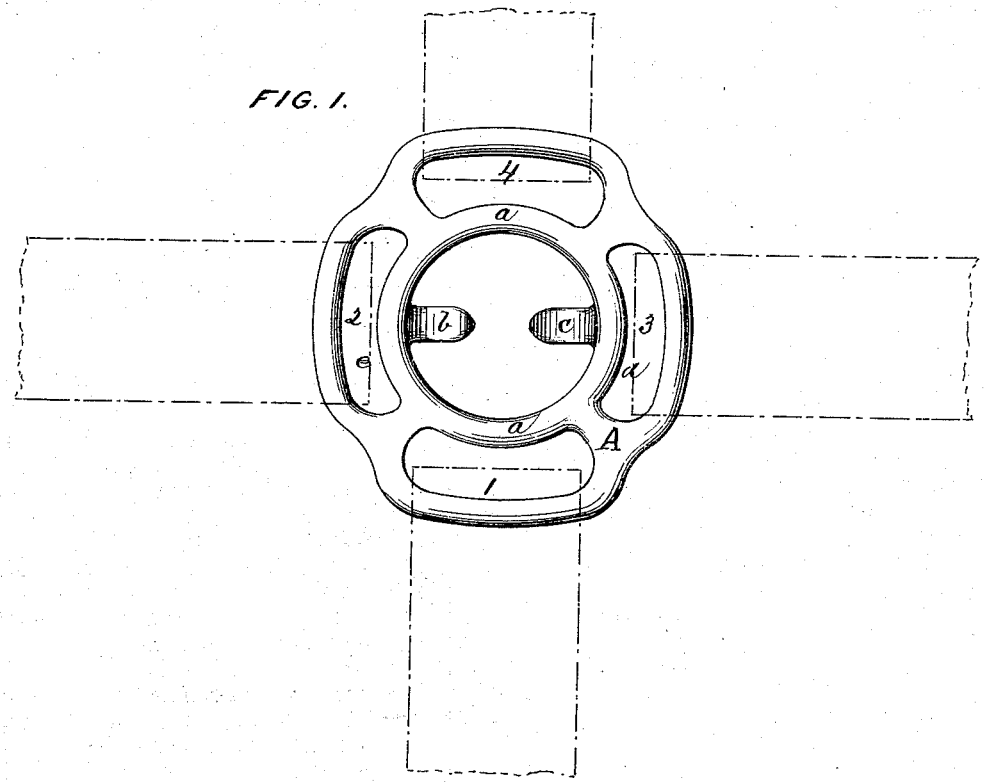
FIG. I.
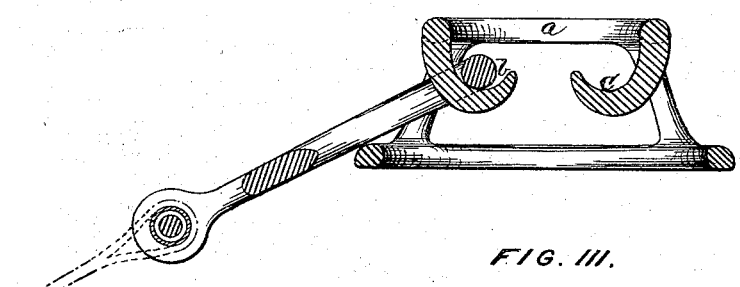
FIG. II.
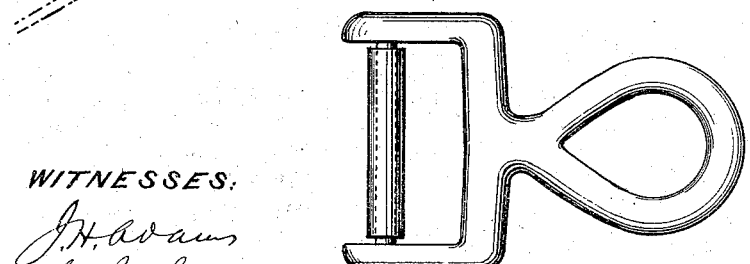
FIG. III.
WITNESSES:
J. H. Adams
T. L. Talcott
INVENTOR:
John Crawford
by B. F. James,
his Atty.

UNITED STATES PATENT OFFICE.

JOHN CRAWFORD, OF PITTSBURG, PENNSYLVANIA.

IMPROVEMENT IN TRACE-CARRIERS.

Specification forming part of Letters Patent No. 152,727, dated July 7, 1874; application filed May 16, 1874.

*To all whom it may concern:*

Be it known that I, JOHN CRAWFORD, of the city of Pittsburg, county of Allegheny and State of Pennsylvania, have invented a new and useful Improvement in Holders for Traces of Harness; and I do hereby declare the following to be a true, full, and correct description of the construction and operation of the same, reference being had to the accompanying drawings making part and parcel of this my specification.

The nature of my invention consists of the construction of a trace-holder, simple in its arrangement, and free from the objections urged against those now in use, that tend to pull out and destroy the hair of the tail of the horse, and admits of a free and easy movement and manipulation of the traces in their attachment and adjustment to the same.

This device is adjusted to the back part of the harness, and is so arranged that the back and hip straps of the harness may be easily attached thereto, and upon the upper rim of such holder is attached or cast downward and inward projecting hooks, to receive the cockeye of the traces; and by which construction of said hooks there is no liability, or even possibility, of the tail of the horse or animal coming in contact with the same, and the hair becoming caught therein and pulled out, as in some other analogous devices.

In the drawing, A represents the form and construction of the trace holder or carrier, the frame of which forms open spaces 1 2 3 4. The back-strap of the harness is attached in the usual manner to the frame 1, the hip-straps to frame 2 and 3, and the crupper to frame 4. To the upper circular rim *a* the two hooks *b* and *c* are attached or cast, projecting downward and inward, and possessing such a degree of curvature of the ends of said hooks as to secure and retain upon them the cockeye attached to the traces of the harness or the slots cut in the leather of such traces. The ends of the traces are inserted through the spaces *d* and *e*. When it is desired to attach the same to the hooks, and when so attached, they do not project upon the outside of said holder a sufficient distance to come in contact with any door or stall into which the horse may pass through or be placed while the harness remains upon him, and the traces remain in nearly a flat position upon the sides of the horse. The said hooks being formed upon the rim, as described, lie sufficiently far below the same as to allow the tail of the animal to pass freely and smoothly over such rim without any liability to be caught upon or by the hooks referred to.

It will be observed that the top rim is circular and unbroken, and thus, having no breaks in it, the reins or tail of the horse may pass over and upon it smoothly, with no liability of being caught or retained therein.

In the drawing, Figure 1 shows a top or plan view of my trace holder or carrier, with the back and hip straps (shown in dotted lines) attached to the same. Fig. 2 is a central cross-section of the same, showing the form of the hooks attached to the rim, and the cockeye of the trace attached to one of the hooks. Fig. 3 shows a cockeye.

What I claim as my invention, and desire to secure by Letters Patent, is—

A trace-carrier having its upper rim *a* constructed with an unbroken circle, and the hooks *b* and *c* rigidly attached to such rim, and projecting downward and inward, in the manner and for the purpose herein described.

JOHN CRAWFORD.

Witnesses:
  WILLIAM F. ROBB,
  JOHN M. ROBB.